US009066281B2

(12) United States Patent
Qin et al.

(10) Patent No.: US 9,066,281 B2
(45) Date of Patent: Jun. 23, 2015

(54) METHOD, DEVICE, AND SYSTEM FOR TRANSMITTING PACKET SWITCHED SERVICES

(75) Inventors: Yali Qin, Shanghai (CN); Xinfa Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 237 days.

(21) Appl. No.: 13/091,555

(22) Filed: Apr. 21, 2011

(65) Prior Publication Data
US 2011/0194498 A1 Aug. 11, 2011

Related U.S. Application Data

(63) Continuation of application No. PCT/CN2009/074548, filed on Oct. 21, 2009.

(30) Foreign Application Priority Data

Oct. 22, 2008 (CN) .......................... 2008 1 0171635

(51) Int. Cl.
*H04W 4/00* (2009.01)
*H04W 48/18* (2009.01)
(Continued)

(52) U.S. Cl.
CPC ............ *H04W 48/18* (2013.01); *H04W 76/022* (2013.01); *H04W 88/16* (2013.01)

(58) Field of Classification Search
CPC ... H04W 76/02; H04W 76/022; H04W 76/04; H04W 76/041; H04W 92/02; H04W 92/24; H04W 74/00; H04W 76/026

USPC .................. 370/310, 328, 329, 331; 455/403, 455/422.1, 436
See application file for complete search history.

(56) References Cited

U.S. PATENT DOCUMENTS 6,553,006 B1 * 4/2003 Kalliokulju et al. .......... 370/310
6,970,694 B2 * 11/2005 Shaheen .................... 455/414.1
(Continued)

FOREIGN PATENT DOCUMENTS

CN      1863140 A     11/2006
CN      1913713 A     2/2007
(Continued)

OTHER PUBLICATIONS

International Search Report from P.R. China in International Application No. PCT/CN2009/074548 mailed Jan. 28, 2010.
(Continued)

*Primary Examiner* — Chi H Phan
*Assistant Examiner* — Robert Lopata
(74) *Attorney, Agent, or Firm* — Leydig, Voit & Mayer, Ltd.

(57) ABSTRACT

A method, a device, and a system for transmitting Packet Switched (PS) services are provided. The method includes: receiving an Activate Packet Data Protocol (PDP) Context Request message of PS services sent by a User Equipment (UE), in which the Activate PDP Context Request message carries an Access Point Name (APN) for identifying a first service network or a second service network (s201); establishing a corresponding transmission channel according to the APN (s202); and transmitting the PS services to the corresponding service network through the established transmission channel (s203). Through the method and the device, different networks are selected to transmit the PS services according to the APN for identifying different networks in the Activate PDP Context Request message of PS services sent from the UE, thereby implementing distribution of the PS services.

20 Claims, 7 Drawing Sheets

(51) Int. Cl.
*H04W 76/02* (2009.01)
*H04W 88/16* (2009.01)

(56) References Cited

U.S. PATENT DOCUMENTS

| | | | |
|---|---|---|---|
| 7,152,160 B2* | 12/2006 | Lantto et al. | 713/168 |
| 7,185,067 B1* | 2/2007 | Viswanath et al. | 709/217 |
| 7,299,030 B2* | 11/2007 | Jung | 455/406 |
| 7,394,795 B2* | 7/2008 | Chitrapu et al. | 370/338 |
| 7,406,068 B2* | 7/2008 | Chitrapu et al. | 370/338 |
| 7,467,208 B1* | 12/2008 | Hurtta et al. | 709/227 |
| 8,428,050 B2* | 4/2013 | Zhu et al. | 370/352 |
| 8,432,893 B2* | 4/2013 | Chitrapu et al. | 370/351 |
| 8,462,770 B2* | 6/2013 | Kant et al. | 370/352 |
| 2001/0036175 A1* | 11/2001 | Hurtta | 370/352 |
| 2003/0081607 A1* | 5/2003 | Kavanagh | 370/392 |
| 2003/0185187 A1 | 10/2003 | Chitrapu et al. | |
| 2007/0091862 A1* | 4/2007 | Ioannidis | 370/338 |
| 2007/0213057 A1* | 9/2007 | Shaheen | 455/436 |
| 2007/0253359 A1 | 11/2007 | Hall et al. | |
| 2008/0254833 A1 | 10/2008 | Keevill et al. | |
| 2011/0058479 A1* | 3/2011 | Chowdhury | 370/237 |
| 2012/0087345 A1* | 4/2012 | Yan et al. | 370/331 |

FOREIGN PATENT DOCUMENTS

| | | |
|---|---|---|
| CN | 101202702 A | 6/2008 |
| CN | 101272305 A | 9/2008 |
| CN | 101374111 A | 2/2009 |
| EP | 2 314 128 | 2/2010 |
| KR | 10-2006-0096757 | 9/2006 |

OTHER PUBLICATIONS

First Chinese Office Action of Chinese Application No. 200810171635.2 mailed May 4, 2010.

Extended European Search Report dated (mailed) Feb. 9, 2012, issued in related Application No. 09821593.2-2412/2352259 PCT/CN2009074548, Hauwei Technologies Co., Ltd.

Qualcomm Europe, "Local IP access baseline solution for EHNB," TD S2-092308 3GPP TSG SA WG2 Meeting #72 Hangzhou, China Mar. 30-Apr. 3, 2009.

Huawei, BT, "Architectural Requirements of Internet Offload," 3GPP TSG SA WG2 TD S2-095900, Meeting #75, Kyoto, Japan, Aug. 31-Sep. 4, 2009.

Huawei, "Selected IP Traffic Offload for UMTS at Iu-PS," 3GPP TSG SA WG2 TD S2-096067 Meeting #75, Kyoto, Japan, Aug. 31-Sep. 4, 2009.

Written Opinion of the International Searching Authority (translation) dated (mailed) Jan. 28, 2010, issued in related Application No. PCT/CN2009/074548, filed Oct. 21, 2009, Huawei Technologies Co., Ltd.

1st Office Action in corresponding European Patent Application No. 09821593.2 (Jul. 11, 2013).

* cited by examiner

METHOD, DEVICE, AND SYSTEM FOR TRANSMITTING PACKET SWITCHED SERVICES

CROSS-REFERENCE TO RELATED APPLICATIONS

This application is a continuation of International Application No. PCT/CN2009/074548, filed on Oct. 21, 2009, which claims priority to Chinese Patent Application No. 200810171635.2, filed on Oct. 22, 2008, both of which are hereby incorporated by reference in their entireties.

FIELD OF THE INVENTION

The present invention relates to the field of wireless communications, and in particular, to a method, a device, and a system for transmitting Packet Switched (PS) services.

BACKGROUND OF THE INVENTION

In the prior art, it is proposed that evolution is performed on High Speed Packet Access (HSPA) in two aspects, that is, air interface and network architecture, so as to improve the system performance. The air interface evolution includes downlink Multiple Input Multiple Output (MIMO), downlink 64 Quadrature Amplitude Modulation (64 QAM), and uplink 16QAM. HSPA+flat architecture is proposed for the network architecture evolution. As optional HSPA+architecture, the architecture has the following features: functions of an original Radio Network Controller (RNC) are fully migrated to an evolved HSPA NodeB; the evolved HSPA NodeB is directly connected to a Serving General Packet Radio Service (GPRS) Support Node (SGSN) of a core network through an IuPS interface, and if one tunnel mode is supported, a user plane of the evolved HSPA NodeB may be directly connected to a Gateway GPRS Support Node (GGSN) through a Gn interface, and a control plane is still connected to the SGSN through the IuPS interface. The HSPA+evolution is mainly PS service oriented, and in order to be backward compatible with conventional Circuit Switched (CS) services of a User Equipment (UE), an Iu-CS control plane interface is reserved. The evolved HSPA NodeBs are connected to each other through the Iur interface, and the evolved HSPA NodeB and the RNC are connected to each other through the Iur interface.

Compared with conventional architecture, this architecture has fewer nodes, and has similar Radio Access Network (RAN) architecture to Long Term Evolution (LTE). Meanwhile, when the PS traffic rises, load impact on the RNC node in the conventional architecture may be reduced. For an operator, the device types and the maintenance cost are reduced by reducing the RNC node.

During a PS call, a session needs to be established, that is, a Packet Data Protocol (PDP) context activation process is needed, and the specific procedure is shown in FIG. 1. In an Activate PDP Context Request message sent to the SGSN from the UE, the UE provides an Access Point Name (APN) to provide a destination network name of the current session of the UE. The core network queries and obtains an address of the APN through a Domain Name System (DNS) service. After the SGSN receives the Activate PDP Context Request message, the SGSN sends a Create PDP Context Request message to the corresponding GGSN according to the obtained APN information. After a response (Create PDP Context Response) of the GGSN is obtained, a Radio Access Bearer (RAB) setup process is performed between the SGSN and the RAN, and between the RAN and the UE. During such process, if a user plane is established between the RAN and the GGSN by using the direct tunnel technology instead of through the SGSN, the user plane address provided in an RAB Assignment Request message returned to the RNC from the SGSN points to the GGSN, and if a non-direct tunnel mode is used, the user plane address points to the SGSN. The SGSN sends an Invoke Trace message to the RNC to start a tracing process. If Quality of Service (QoS) degradation occurs in the RAB setup process, the SGSN updates QoS data to the GGSN through an Update PDP Context Request, and the GGSN returns an Update PDP Context Response message to the SGSN to confirm that the operation succeeds.

In the prior art, the evolved HSPA NodeB supports the IuPS interface and the IuCS control plane interface, and is connected to the core network in the PS domain and the CS domain through the two interfaces, respectively. The two interfaces transmit the user service data to the core network through the evolved HSPA NodeB.

In the implementation of the present invention, the inventors find that the prior art at least has the following disadvantages:

In the PS services, some services have low QoS requirements, but still occupy expensive telecommunication network transmission resources, thereby causing certain waste of the network resources.

SUMMARY OF THE INVENTION

Embodiments of the present invention provide a method, a device, and a system for transmitting PS services, so as to implement distribution of the PS services according to different destination addresses in the PS services when a communication system supports the PS services.

A method for transmitting PS services provided in an embodiment of the present invention includes:

receiving an Activate PDP Context Request message of PS services sent from a UE, in which the Activate PDP Context Request message carries an APN for identifying a core network or an external network;

establishing a corresponding transmission channel according to the APN, in which if the APN identifies the external network, a transmission channel directly connected to the external network is established; and transmitting the PS services through the established transmission channel.

An access network device provided in an embodiment of the present invention is applied in a system for transmitting PS services to communicate with a UE in the system, and includes:

a channel establishment unit, configured to establish a transmission channel between the UE and an access network when an APN for identifying a core network or an external network carried in a received Activate PDP Context Request message of PS services sent from the UE identifies the external network, in which the transmission channel is directly connected to the external network; and a service transmission unit, configured to directly transmit the PS services to the external network through the transmission channel established by the channel establishment unit.

A system for transmitting PS services provided in an embodiment of the present invention includes:

a recognition unit, configured to receive an Activate PDP Context Request message of PS services sent from a UE, and recognize an APN for identifying a core network or an external network carried in the Activate PDP Context Request message;

a channel unit, configured to establish a corresponding transmission channel according to the APN, in which if the APN identifies the external network, a transmission channel directly connected to the external network is established; and a transmission unit, configured to transmit the PS services through the transmission channel established by the channel unit.

Compared with the prior art, the embodiments of the present invention at least have the following advantages.

Different transmission networks are selected to transmit the PS services according to the different APNs in the Activate PDP Context Request message of PS services sent from the UE, so that the distribution of the PS services is implemented, and the transmission of Internet services does not pass through the core network, thereby dramatically reducing the requirements for transmission network resources and the cost.

DETAILED DESCRIPTION OF THE EMBODIMENTS

Figure 1:
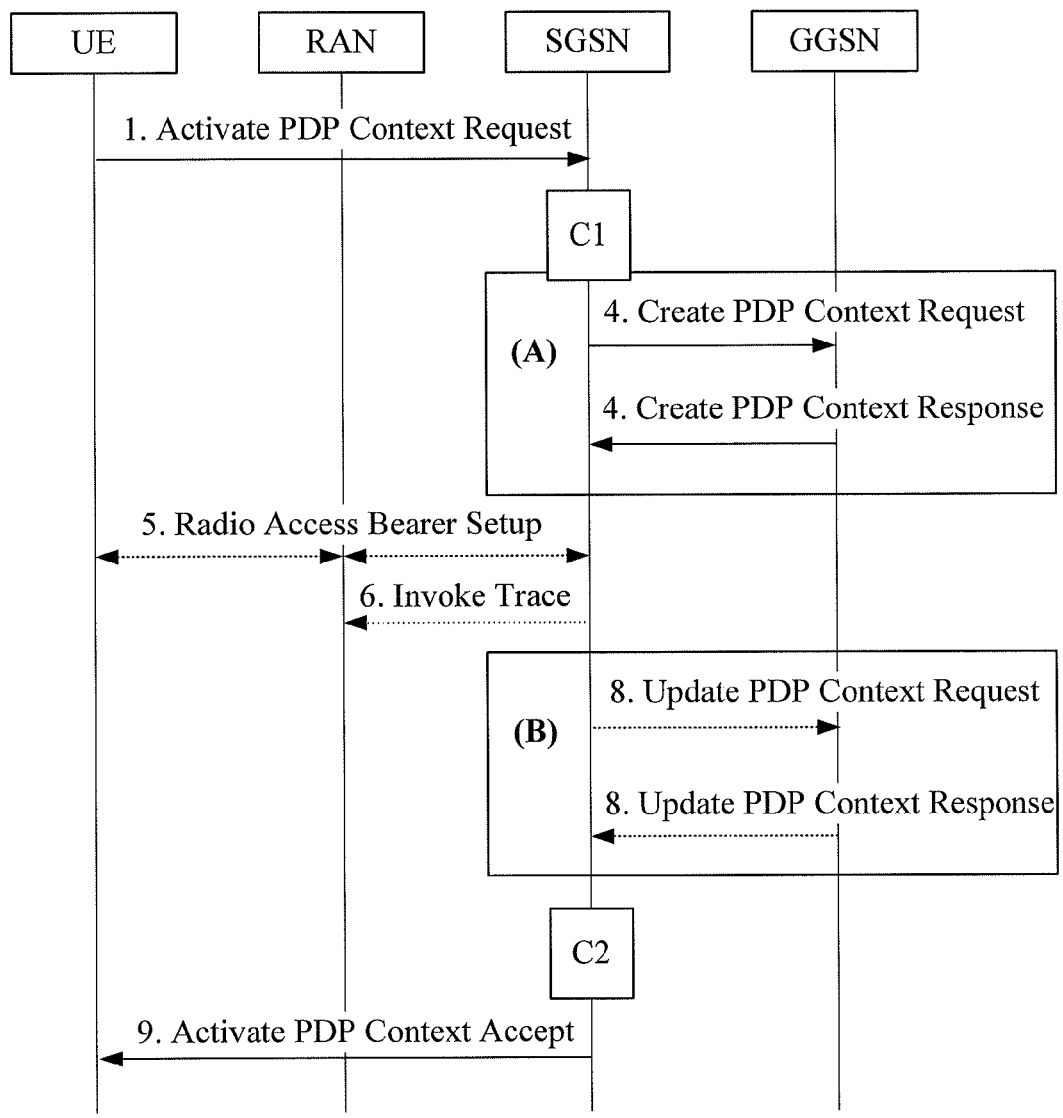
FIG. 1 is a schematic diagram of a PDP context activation process in the prior art.
Figure 2:
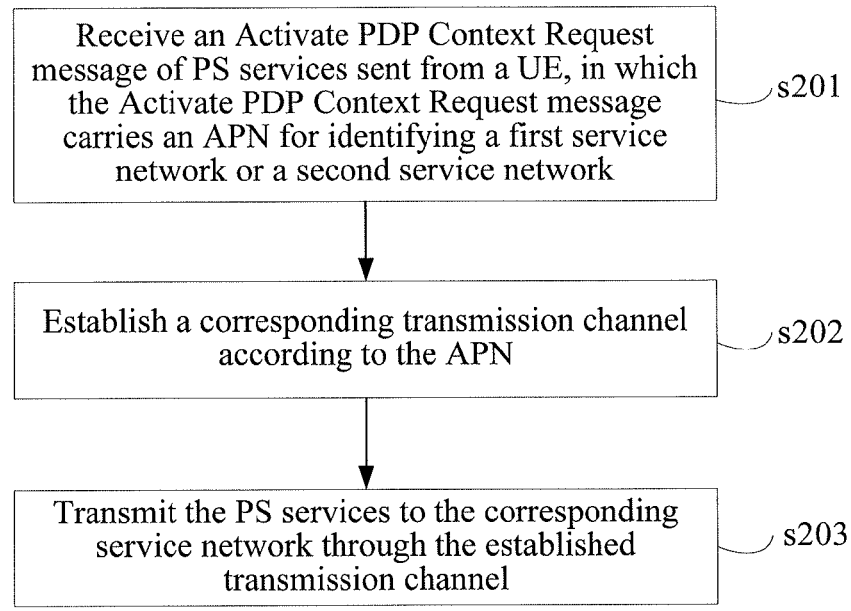
FIG. 2 is a schematic flow chart of a method according to an embodiment of the present invention.

An embodiment of the present invention provides a method for transmitting PS services, and as shown in FIG. 2, the method includes the following steps:

Step s201: Receive an Activate PDP Context Request message of PS services sent from a UE, in which the Activate PDP Context Request message carries an APN for identifying a first service network or a second service network.

The first service network may be a core network, and the second service network may be an external network.

Step s202: Establish a corresponding transmission channel according to the APN.

Step s203: Transmit the PS services to the corresponding service network through the established transmission channel.

Through the method in the embodiment of the present invention, different networks are selected to transmit the PS services according to the APN for identifying different networks in the Activate PDP Context Request message of PS services sent from the UE, thereby implementing the distribution of the PS services.

The embodiments of the present invention are described in further detail in the following with reference to specific application scenarios, in which a communication system is, for example, Wideband Code Division Multiple Access (WCDMA), and the recognition of the APN is implemented, for example, in an RAN.

Figure 3A:
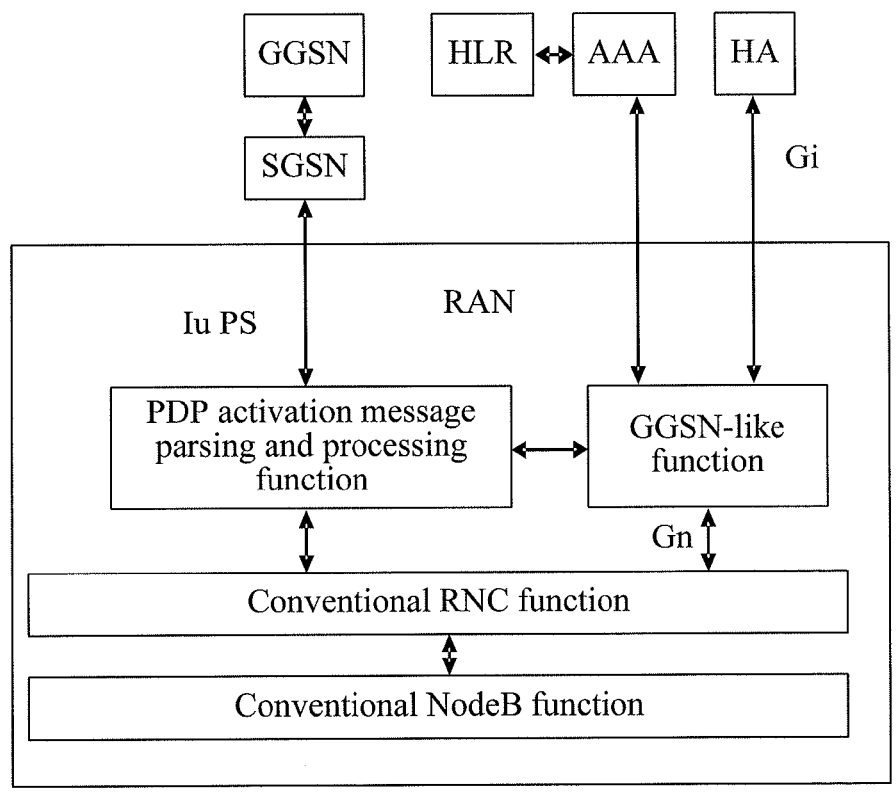
FIG. 3A is a schematic diagram of an application scenario of a method according to an embodiment of the present invention.

An embodiment of the present invention provides a method for transmitting PS services, and the application scenario thereof is shown in FIG. 3A. In a network, an RAN has a PDP activation message parsing and processing function (which may be implemented by a first module) and a GGSN-like function (which may be implemented by a second module) in addition to conventional RNC and NodeB functions. The PDP activation message parsing and processing function is to receive and parse an Activate PDP Context Request message sent from a UE, and the GGSN-like function is to route user data and allocate Internet Protocol (IP) addresses to the UE.

In addition, the RAN includes logical interfaces Iu PS and Gi, in which the Iu PS interface is connected to the core network of a PS domain, and the Gi interface is connected to an external network, for example, the Gi interface is connected to a public Asymmetric Digital Subscriber Line (ADSL) network or directly connected to the Internet.

Figure 3B:
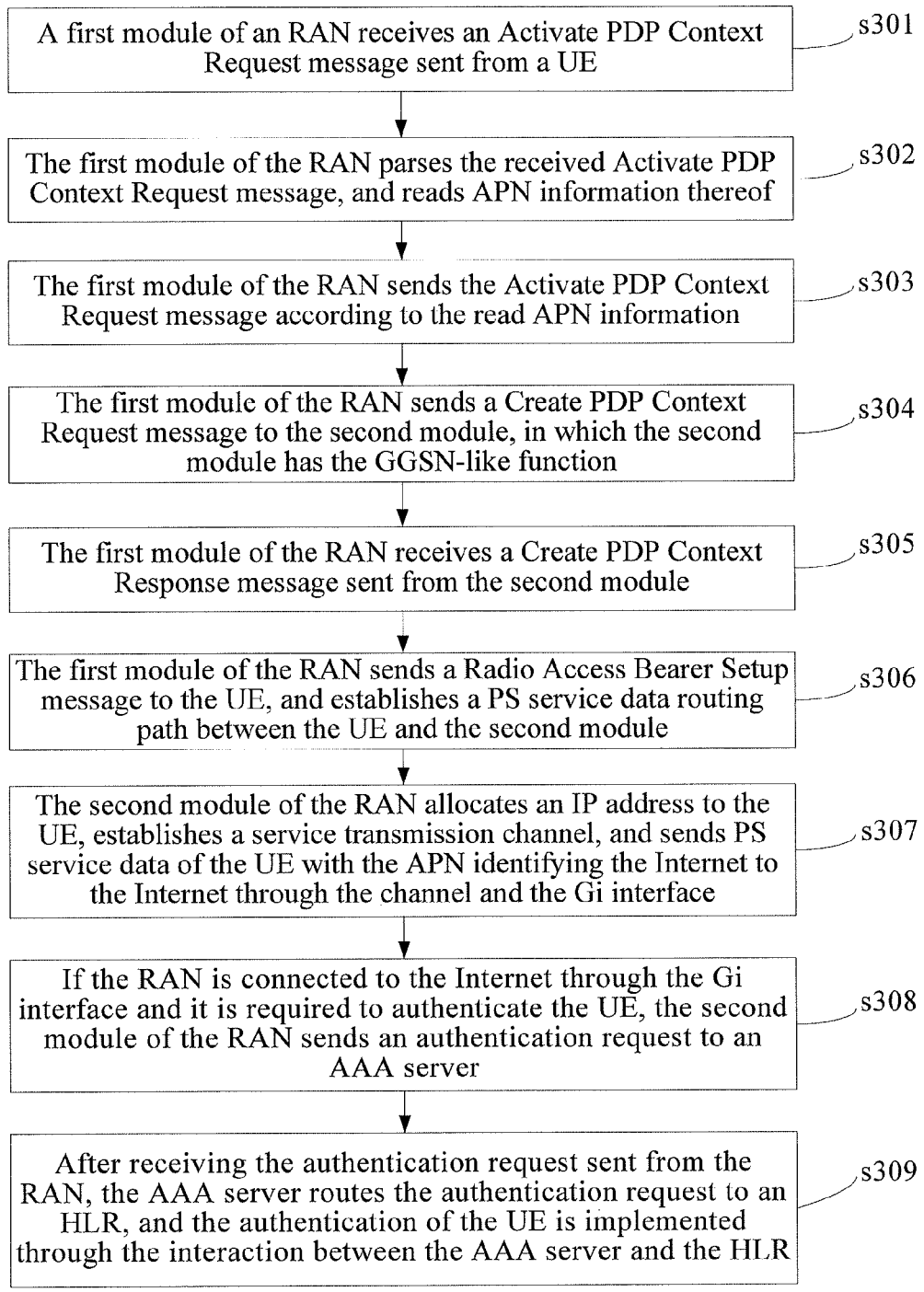
FIG. 3B is a schematic flow chart of a method according to an embodiment of the present invention.

Specifically, as shown in FIG. 3B, the method for transmitting PS services includes the following steps:

Step s301: A first module of an RAN receives an Activate PDP Context Request message sent from a UE.

Specifically, the first module of the RAN has the PDP activation message parsing and processing function, and receives the Activate PDP Context Request message sent from the UE.

Step s302: The first module of the RAN parses the received Activate PDP Context Request message, and reads APN information thereof.

Specifically, the first module of the RAN parses the received Activate PDP Context Request message through the PDP activation message parsing and processing function thereof, and reads the APN information carried by the message.

Step s303: The first module of the RAN sends the Activate PDP Context Request message according to the read APN information.

The first module of the RAN sends the Activate PDP Context Request message according to the read APN information. When the APN information identifies a GGSN of a core network, the first module of the RAN transparently transmits the message to an SGSN, and after the SGSN receives the Activate PDP Context Request message, the SGSN sends a Create PDP Context Request message to the GGSN. After a response of the GGSN is obtained, an RAB setup process is performed between the SGSN (or the GGSN) and the RAN, and between the RAN and the UE, and an RAB channel is established between the core network and the RAN and between the RAN and the UE for service communication.

Specifically, the SGSN sends an RAB Assignment Request message to the RAN to request the RAN to establish the RAB channel between the RAN and the SGSN and between the RAN and the UE. After the RAN receives the RAB Assignment Request message, the RAN establishes the RAB channel between the RAN and the SGSN and between the RAN and the UE according to channel parameter information carried in the message, such as a signal transmission rate, and sends the PS services to the SGSN through the established RAB channel. When the system uses a direct tunnel mode, the RAB Assignment Request message sent from the SGSN includes address information of the GGSN, and the RAN establishes the RAB channel between the RAN and the GGSN and between the RAN and the UE, and sends the PS services to the GGSN. Afterwards, the received PS services are sent to the core network through the SGSN or the GGSN.

When the APN information identifies the external network connected to the Gi interface, a second module of the RAN having the GGSN-like function is required to process the Activate PDP Context Request message, and step s304 is performed.

Step s304: The first module of the RAN sends a Create PDP Context Request message to the second module, in which the second module has the GGSN-like function.

Step s305: The first module of the RAN receives a Create PDP Context Response message sent from the second module.

Specifically, the Create PDP Context Response message sent from the second module of the RAN includes address information of the second module.

Step s306: The first module of the RAN sends a Radio Access Bearer Setup message to the UE, and establishes a PS service data routing path between the UE and the second module.

Specifically, the Radio Access Bearer Setup message contains the address information of the second module received by the first module of the RAN, the first module of the RAN sends the address information to the UE, and the UE accesses the second module of the RAN by using the address information, interacts with the second module of the RAN, and establishes the PS service data routing path.

Step s307: The second module of the RAN allocates an IP address to the UE, establishes a service transmission channel, and sends the PS service data of the UE with the APN identifying the Internet to the Internet through the channel and the Gi interface.

The GGSN-like functions of the second module of the RAN further include: an interface conversion function and an address allocation function, which are responsible for routing data, allocating IP addresses, and sending the PS service data of the UE to the Internet.

Optionally, the method may further include step s308 and step s309.

Step s308: If the RAN is connected to the Internet through the Gi interface and it is required to authenticate the UE, the second module of the RAN sends an authentication request to an Authentication, Authorization and Accounting (AAA) server.

Step s309: After receiving the authentication request sent from the RAN, the AAA server routes the authentication request to a Home Location Register (HLR), and the authentication of the UE is implemented through the interaction between the AAA server and the HLR.

In the embodiment of the present invention, a device in the RAN is an access network device, and the access network device may be an enhanced NodeB (eNB) in an HSPA flat architecture, or an eNB in an LTE system, or a base station in a Code Division Multiple Access 2000 (CDMA2000) system, or a NodeB in a Time Division-Synchronous Code Division Multiple Access (TD-SCDMA) system, and the present invention is not limited thereto.

Through the method in the embodiment of the present invention, different networks are selected to transmit the PS services according to the APN for identifying different networks in the Activate PDP Context Request message of PS services sent from the UE, thereby implementing the distribution of the PS services.

Specifically, the parsing and processing of the PDP activation message are implemented in the access network RAN (which may be implemented through a module having the PDP activation message parsing and processing function), the message with the APN identifying the external network (such as the Internet) in the Activate PDP Context Request message is processed, and the message with the APN identifying the core network is transparently transmitted. If the recognition result in the access network indicates that the APN identifies the core network, the Activate PDP Context Request message is sent to a network device of the core network, and a first transmission channel between the UE and the core network is established. If the recognition result indicates that the APN identifies the external network, a second transmission channel between the UE and the access network is established, and the second transmission channel is directly connected to the external network.

In this way, in the case that the RAN supports dual interfaces (one interface connects the core network, such as an IuPS interface, and the other interface connects the external network, such as the Gi interface) at the same time, services pointing to different networks may be distributed, and the services pointing to the external network may be directly transmitted to a service server through the second transmission channel without being forwarded by the core network. Therefore, on one hand, the traffic load of the core network is reduced, and on the other hand, when the second transmission channel uses a low-cost transmission network, the transmission cost may be reduced.

In addition, if the RAN is connected to the external network and it is required to authenticate the UE, the authentication request may be sent to the AAA server, and the authentication is performed through the interaction between the AAA server and the HLR.

Figure 4A:
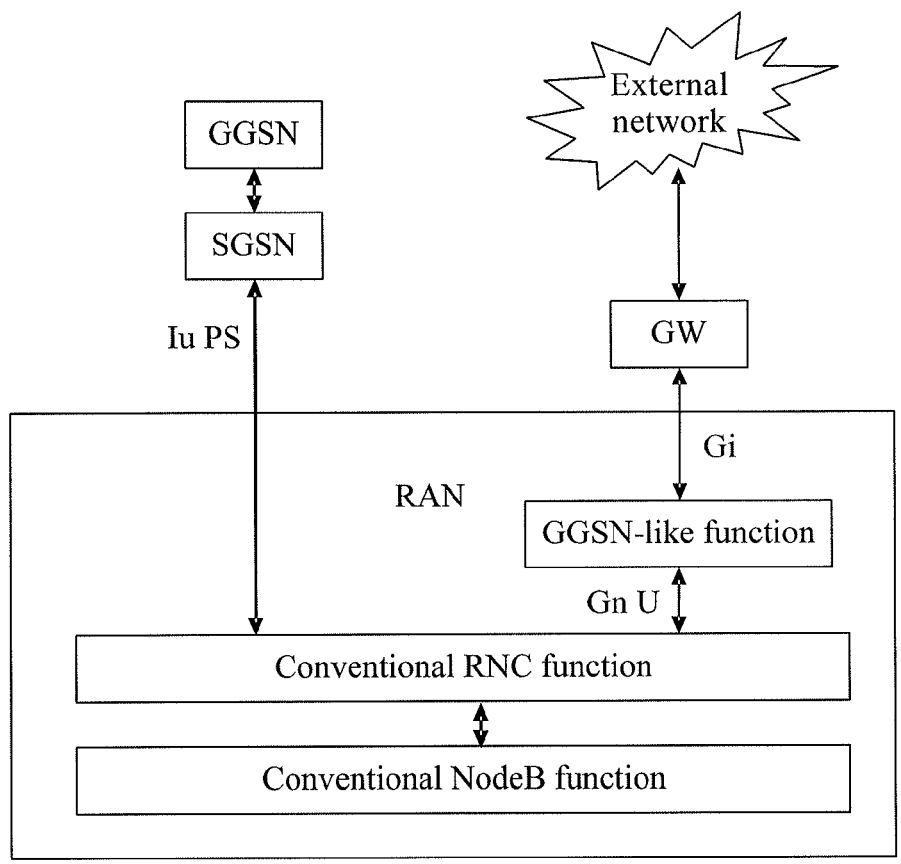
FIG. 4A is a schematic diagram of an application scenario of a method according to an embodiment of the present invention.

An embodiment of the present invention provides a method for transmitting PS services. As shown in FIG. 4A, in this embodiment, an SGSN receives and parses an Activate PDP Context Request message sent from a UE, that is, the recognition of an APN may be implemented in a core network. The RAN further has a GGSN-like function for the routing user data and allocating IP addresses to UE in addition to conventional RNC and NodeB functions.

In addition, the RAN includes logical interfaces Iu PS and Gi, in which the Iu PS interface is connected to the core network of a PS domain, and the Gi interface is connected to any other low-cost transmission network, such as a public ADSL network, or is directly connected to the Internet.

Figure 4B:
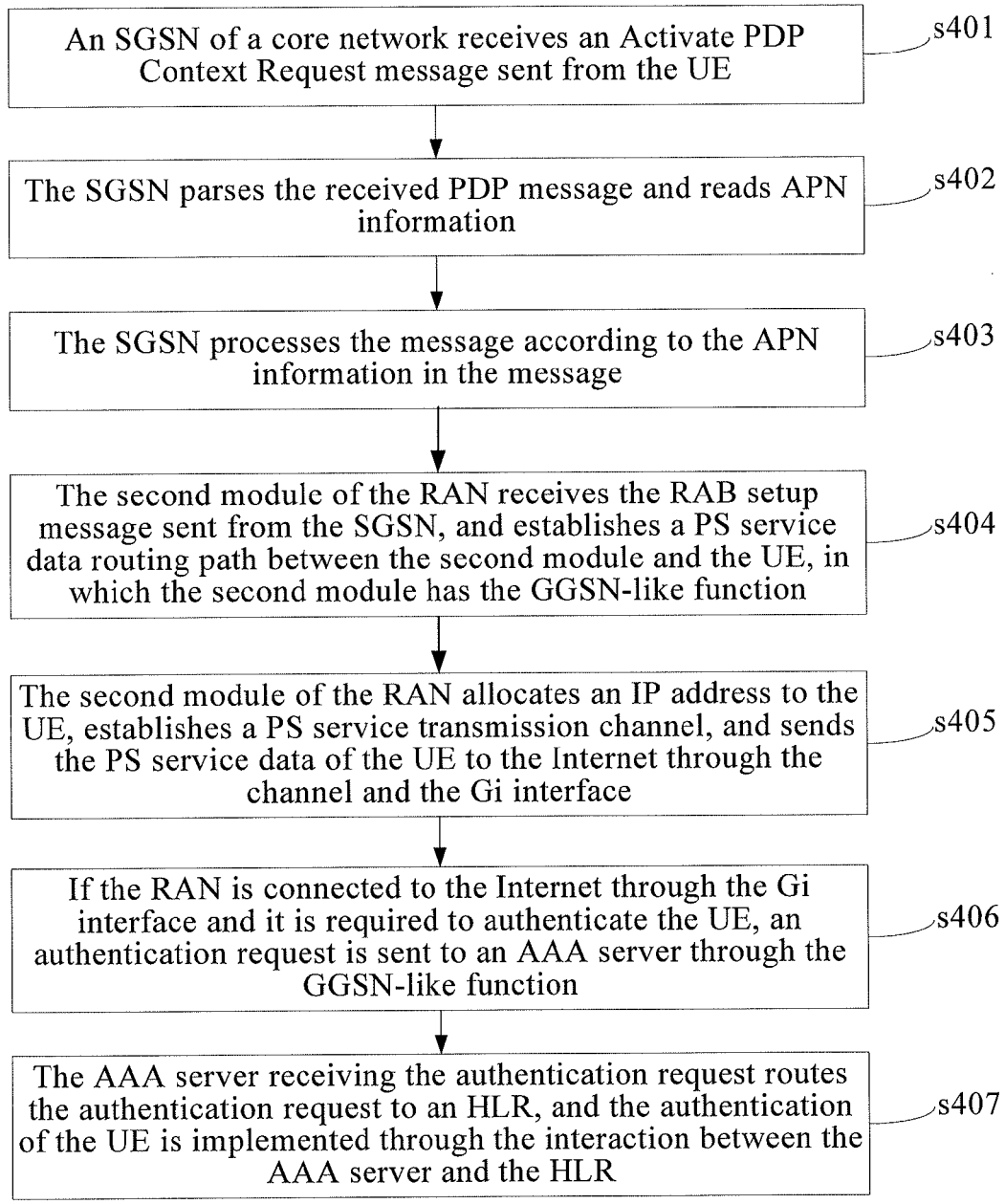
FIG. 4B is a schematic flow chart of a method according to an embodiment of the present invention.

Specifically, as shown in FIG. 4B, the method for transmitting PS services includes the following steps:

Step s401: An SGSN of a core network receives an Activate PDP Context Request message forwarded by an RAN.

Step s402: The SGSN parses the received PDP message and reads APN information.

Step s403: The SGSN processes the message according to the APN information in the message.

A special APN is set in the core network, and the SGSN performs different operations according to the APN in the received message.

When the APN identifies a GGSN of the core network, the SGSN sends a message to the GGSN for interaction. When the APN identifies a Gateway (GW) connected to the Gi interface, or is a set specific APN, the SSGN does not interact with the GGSN, but directly returns an RAB Assignment Request message to the RAN, performs an RAB assignment procedure, and modifies address information of Iu transport association in the RAB Assignment Request message to point to a second module in the RAN having the GGSN-like function, and then Step s404 is performed.

Step s404: The second module of the RAN receives the RAB Assignment Request message sent from the SGSN, and establishes a PS service data routing path between the second module and the UE, in which the second module has the GGSN-like function.

Specifically, the RAN performs the RAB assignment procedure according to the RAB Assignment Request message, the address information in the RAB Assignment Request points to the second module of the RAN, and the second module of the RAN establishes the PS service data routing path between the second module and the UE according to the address information.

Step s405: The second module of the RAN allocates an IP address to the UE, establishes a PS service transmission channel, and sends the PS service data of the UE to the Internet through the channel and the Gi interface, in which the second module has the GGSN-like function.

Optionally, the method may further include steps s406 and s407.

Step s406: If the RAN is connected to the Internet through the Gi interface and it is required to authenticate the UE, an authentication request is sent to an AAA server through the GGSN-like function.

Step s407: The AAA server receiving the authentication request routes the authentication request to an HLR, and the authentication of the UE is implemented through the interaction between the AAA server and the HLR.

Through the method in the embodiment of the present invention, different networks are selected to transmit the PS services according to the APN for identifying different networks in the Activate PDP Context Request message of PS services sent from the UE, thereby implementing the distribution of the PS services.

Specifically, the parsing and processing of the PDP activation message are implemented in the core network. For example, the SGSN modifies a PDP context processing procedure with the APN identifying the external network (such as the Internet), so as to directly establish, in the access network, a user plane channel to the external network. When the APN identifies the GGSN of the core network, the SGSN sends a message to the GGSN for interaction.

In this way, in the case that the RAN supports dual interfaces (one connects the core network, such as an IuPS interface, and the other connects the external network, such as the Gi interface) at the same time, services pointing to different networks may be distributed, and the services pointing to the external network may be directly transmitted to a service server through a second transmission channel without being forwarded by the core network. Therefore, on one hand, the traffic load of the core network is reduced, and on the other hand, when the second transmission channel uses a low-cost transmission network, the transmission cost may be reduced.

In addition, if the RAN is connected to the external network and it is required to authenticate the UE, the authentication request may be sent to the AAA server, and the authentication is performed through the interaction between the AAA server and the HLR.

The method provided in the embodiments of the present invention is introduced in just one specific application scenario. Definitely, the present invention is applicable to other scenarios, such as LTE, CDMA2000, and TD-SCDMA communication systems. When the embodiments of the present invention are applied in the LTE communication system, the RAN in the embodiments of the present invention may be changed to an eNB, and the processing procedure is the same. In CDMA2000, the RAN supports two interfaces, in which one is connected to a Packet Data Serving Node (PDSN), and the other is connected to the Internet. In the TD-SCDMA system, the processing procedure is similar to the processing procedure in the embodiments of the present invention.

Figure 5:
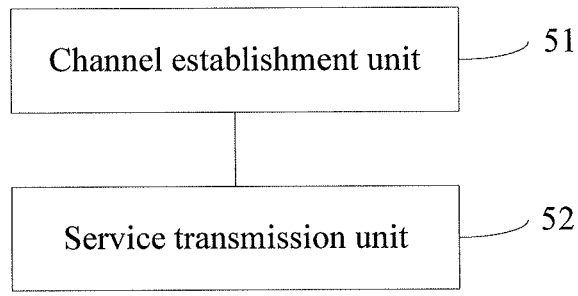
FIG. 5 is a schematic structural diagram of an access network device according to an embodiment of the present invention.

An embodiment of the present invention provides an access network device. The device may be an RAN device or an evolved Node-B (eNb), and is applied in a system for transmitting PS services to communicate with a UE in the system. As shown in FIG. 5, the device includes a channel establishment unit 51 and a service transmission unit 52.

The channel establishment unit 51 is configured to establish a transmission channel between the UE and an access network when an APN for identifying a core network or an external network carried in an Activate PDP Context Request message of PS services sent from the UE identifies the external network, in which the transmission channel is directly connected to the external network. One example of the specific process for establishing the transmission channel is as follows. The channel establishment unit 51 sends a Radio Access Bearer Setup message to the UE, in which the Radio Access Bearer Setup message contains address information of the access network, so that the UE accesses the access network by using the address information, interacts with the access network, and establishes a service data routing path, and an IP address is allocated to the UE, and the transmission channel between the UE and the access network is established.

The service transmission unit 52 is configured to transmit the PS services to the external network through the transmission channel established by the channel establishment unit 51.

Specifically, when a recognition result indicates that the APN identifies the external network, the channel establishment unit 51 establishes the transmission channel between the UE and the access network, in which the transmission channel is directly connected to the external network, and the service transmission unit 52 may transmit the PS services to the external network through the transmission channel.

The access network device may be an eNB in HSPA flat architecture, or an eNB in an LTE system, or a base station in a CDMA2000 system, or a NodeB in a TD-SCDMA system, or the like, which is not limited in this embodiment.

Figure 6:
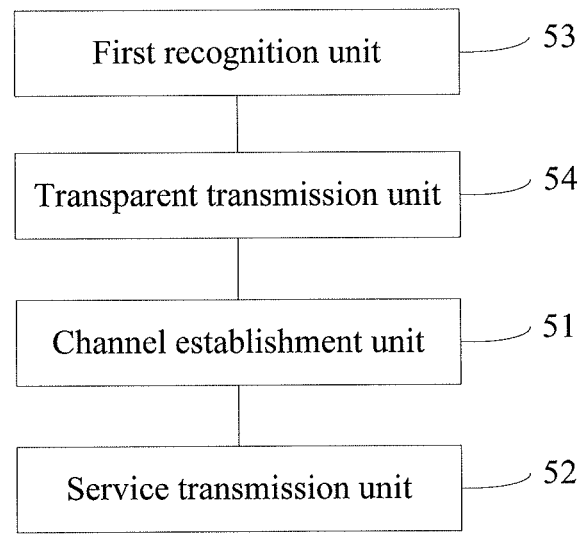
FIG. 6 is a schematic structural diagram of an access network device according to another embodiment of the present invention.

As shown in FIG. 6, in another embodiment of the present invention, the access network device further includes a first recognition unit 53 and a transparent transmission unit 54.

The first recognition unit 53 is configured to receive an Activate PDP Context Request message of PS services sent from a UE, and recognize an APN for identifying a core network or an external network carried in the Activate PDP Context Request message. The transparent transmission unit 54 is configured to transparently transmit the Activate PDP Context Request message to the core network when the APN recognized by the first recognition unit 53 identifies the core network.

Specifically, after receiving the Activate PDP Context Request message of the PS services sent from the UE, the first recognition unit 53 of the access network device recognizes the APN for identifying the core network or the external network carried in the message. When the recognition result indicates that the APN identifies the core network, the transparent transmission unit 54 transparently transmits the Activate PDP Context Request message to the core network.

Figure 7:
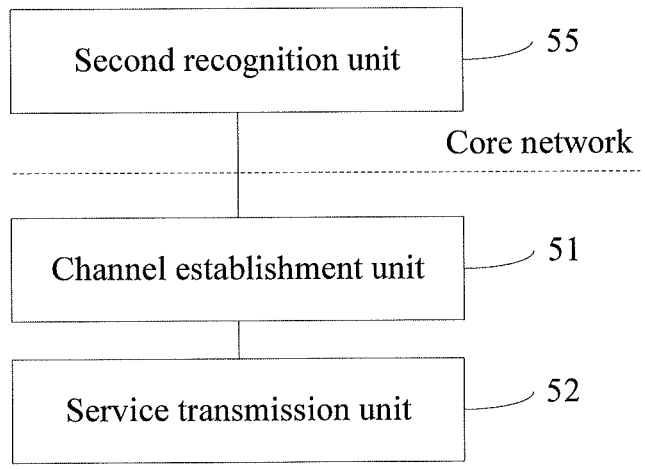
FIG. 7 is a schematic structural diagram of an access network device according to another embodiment of the present invention.

As shown in FIG. 7, in another embodiment of the present invention, the system for transmitting PS services further includes a second recognition unit 55 located in the core network.

The second recognition unit 55 is configured to receive an Activate PDP Context Request message of PS services sent from the UE, and recognize an APN for identifying a first service network or a second service network carried in the Activate PDP Context Request message. The first service network may be a core network, and the second service network may be an external network.

The access network device may be an eNB in HSPA flat architecture, or an eNB in an LTE system, or a base station in a CDMA2000 system, or a NodeB in a TD-SCDMA system.

Through the device in the embodiment of the present invention, different networks are selected to transmit the PS services according to the APN for identifying different networks in the Activate PDP Context Request message of PS services sent from the UE, thereby implementing the distribution of the PS services.

Figure 8:
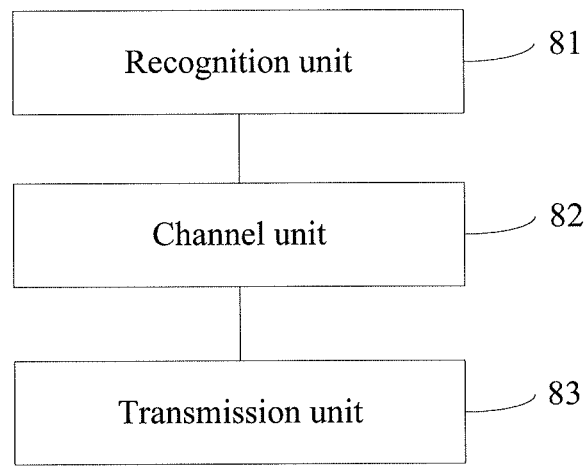
FIG. 8 is a schematic structural diagram of a system for transmitting PS services according to another embodiment of the present invention.

An embodiment of the present invention provides a system for transmitting PS services. As shown in FIG. 8, the system includes a recognition unit 81, a channel unit 82, and a transmission unit 83.

The recognition unit 81 is configured to receive an Activate PDP Context Request message of PS services sent from a UE, and recognize an APN for identifying a first service network or a second service network carried in the Activate PDP Context Request message.

The recognition unit 81 is located in an access network or a core network; the first service network may be the core network, and the second service network may be an external network.

The channel unit 82 is configured to establish a corresponding transmission channel according to the APN.

The transmission unit 83 is configured to transmit the PS services to the corresponding service network through the transmission channel established by the channel unit 82.

Figure 9:
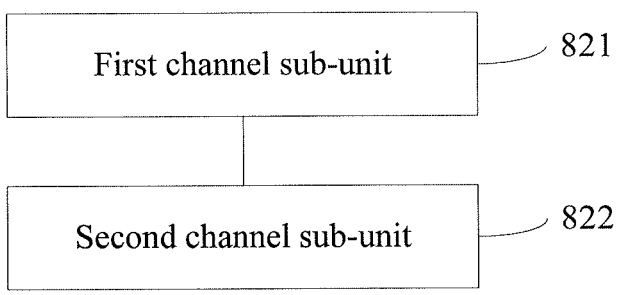
FIG. 9 is a schematic structural diagram of a channel unit in a system for transmitting PS services according to an embodiment of the present invention.

As shown in FIG. 9, the channel unit 82 includes a first channel sub-unit 821 and a second channel sub-unit 822, in which the first channel sub-unit 821 is located in the core network and is configured to establish a first transmission channel between the UE and the core network when a recognition result of the recognition unit 81 indicates that the APN identifies the core network.

Specifically, when the recognition result of the recognition unit 81 indicates that the APN identifies the core network, the first channel sub-unit 821 sends the Activate PDP Context Request message to a network device of the core network, and establishes the first transmission channel between the UE and the core network.

The second channel sub-unit 822 is located in the access network and is configured to establish a second transmission channel between the UE and the access network when the recognition result of the recognition unit 81 indicates that the APN identifies the external network, in which the second transmission channel is directly connected to the external network.

One example of the specific process of establishing the second transmission channel is as follows. The second channel sub-unit 822 sends a Radio Access Bearer Setup message to the UE, in which the Radio Access Bearer Setup message contains address information of the access network, so that the UE accesses the access network by using the address information, interacts with the access network, and establishes a service data routing path. The second channel sub-unit 822 allocates an IP address to the UE, and establishes the second transmission channel between the UE and the access network, in which the second transmission channel is directly connected to the external network.

The system may be an HSPA flat architecture system, or an LTE system, or a CDMA2000 system, or a TD-SCDMA system, or the like, which is not limited in this embodiment.

Through the system in the embodiment of the present invention, different networks are selected to transmit the PS services according to the APN for identifying different networks in the Activate PDP Context Request message of PS services sent from the UE, thereby implementing the distribution of the PS services.

Figure 10:
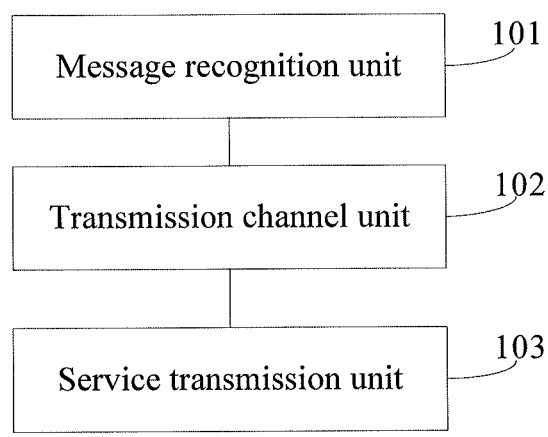
FIG. 10 is a schematic structural diagram of a network device according to an embodiment of the present invention.

As shown in FIG. 10, in another embodiment of the present invention, a network device located in a core network includes a message recognition unit 101, a transmission channel unit 102, and a service transmission unit 103.

The message recognition unit 101 is configured to receive an Activate PDP Context Request message of PS services sent from a UE, and recognize an APN for identifying a first service network or a second service network carried in the Activate PDP Context Request message.

The first service network may be a core network, and the second service network may be an external network.

The transmission channel unit 102 is configured to establish a corresponding transmission channel according to the APN.

Specifically, the transmission channel unit 102 is configured to establish a first transmission channel between the UE and the core network when a recognition result of the message recognition unit 101 indicates that the APN identifies the core network.

The service transmission unit 103 is configured to transmit the PS services to the corresponding service network through the transmission channel established by the transmission channel unit 102.

Through the device in the embodiment of the present invention, different networks are selected to transmit the PS services according to the APN for identifying different networks in the Activate PDP Context Request message of PS services sent from the UE, thereby implementing the distribution of the PS services.

Through the above description of the embodiments, it is clear to persons skilled in the art that the present invention may be accomplished through hardware, or through software plus a necessary universal hardware platform. Based on this, the technical solutions of the present invention may be embodied in the form of a software product. The software product may be stored in a nonvolatile storage media (for example, a CD-ROM, a USB flash drive, or a removable hard disk) and contain several instructions for instructing a computer device (for example, a personal computer, a server, or a network device) to perform the method according to the embodiments of the present invention.

To sum up, the above descriptions are merely exemplary embodiments of the present invention, but are not intended to limit the present invention. Any modification, equivalent replacement, or improvement made without departing from the principle of the present invention should fall within the scope of the present invention.

What is claimed is:

1. A method for transmitting packet switched (PS) services, comprising:
   receiving, by an access network, an Activate Packet Data Protocol (PDP) Context Request message of a PS service sent from a User Equipment (UE), wherein the Activate PDP Context Request message carries an Access Point Name (APN) for identifying one of the group consisting of a core network and an external network;

establishing, by the access network, a corresponding transmission channel according to the APN, wherein if the APN identifies the external network, a transmission channel directly connected to the external network is established via a gateway General Packet Radio Service (GPRS) support node (GGSN)-like function which is configured in the access network; and transmitting, by the access network, the PS service through the established transmission channel;

wherein the GGSN-like function routes user data and allocates Internet Protocol (IP) addresses to the UE, and allows direct connection to the external network via a Gi interface, wherein a logical interface which is configured in the access network connects the GGSN-like function to the external network.

2. The method according to claim 1, wherein the establishing the corresponding transmission channel according to the APN comprises:

recognizing, by an access network device, the APN in the access network;

sending, by the access network device, the Activate PDP Context Request message to a network device of the core network and establishing a first transmission channel between the UE and the core network if the APN identifies the core network; and establishing, by the access network device, a second transmission channel between the UE and the access network if an APN identifies the external network, wherein the second transmission channel is directly connected to the external network.

3. The method according to claim 2, wherein the establishing the second transmission channel between the UE and the access network comprises:

establishing a PS service data routing path in the access network, and allocating an Internet Protocol (IP) address to the UE, so as to complete establishing the second transmission channel.

4. The method according to claim 1, wherein the establishing the corresponding transmission channel according to the APN comprises:

recognizing, by a network device of the core network, the APN;

processing, by the network device of the core network, the Activate PDP Context Request message, and establishing a transmission channel between the UE and the core network if the APN identifies the core network; and sending, by the network device of the core network, a Radio Access Bearer (RAB) Assignment Request message to an access network device, and establishing, by the access network device, a transmission channel between the UE and the access network if the APN identifies the external network, wherein the transmission channel is directly connected to the external network.

5. The method according to claim 4, wherein the establishing, by the access network device, the transmission channel between the UE and the access network comprises:

performing an RAB assignment procedure according to the RAB Assignment Request message, wherein address information in the RAB Assignment Request in the RAB assignment procedure points to the access network; and establishing a PS service data routing path in the access network, and allocating an IP address to the UE, so as to complete establishing the transmission channel.

6. The method according to claim 2, wherein the access network device is one of the group consisting of: (a) an enhanced NodeB (eNB) in High Speed Packet Access (HSPA) flat architecture, (b) an eNB in a Long Term Evolution (LTE) system, (c) a base station in a Code Division Multiple Access 2000 (CDMA2000) system, and (d) a NodeB in a Time Division-Synchronous Code Division Multiple Access (TD-SCDMA) system.

7. The method according to claim 3, wherein the access network device is one of the group consisting of: (a) an enhanced NodeB (eNB) in High Speed Packet Access (HSPA) flat architecture, (b) an eNB in a Long Term Evolution (LTE) system, (c) a base station in a Code Division Multiple Access 2000 (CDMA2000) system, and (d) a NodeB in a Time Division-Synchronous Code Division Multiple Access (TD-SCDMA) system.

8. The method according to claim 3, further comprising: sending an authentication request to an Authentication, Authorization and Accounting (AAA) server.

9. The method according to claim 5, further comprising: sending an authentication request to an Authentication, Authorization and Accounting (AAA) server.

10. An access network device, applied in a system for transmitting packet switched (PS) services to communicate with a User Equipment (UE) in the system, comprising:

a channel establishment unit, configured to establish a transmission channel between the UE and an access network, when an Access Point Name (APN) for identifying a core network or an APN identifying an external network carried in an Activate Packet Data Protocol (PDP) Context Request message of a PS service sent from the UE identifies the external network, wherein the transmission channel is directly connected to the external network via a gateway General Packet Radio Service (GPRS) support node (GGSN)-like function, which is configured in the access network; and a service transmission unit, configured to directly transmit the PS service to the external network through the transmission channel established by the channel establishment unit;

wherein the GGSN-like function routes user data and allocates Internet Protocol (IP) addresses to the UE, and allows direct connection to the external network via a Gi interface, wherein a logical interface which is configured in the access network connects the GGSN-like function to the external network.

11. The access network device according to claim 10, further comprising:

a first recognition unit, configured to receive the Activate PDP Context Request message of the PS service sent from the UE, and recognize the APN for identifying the core network or the APN identifying the external network carried in the Activate PDP Context Request message; and a transparent transmission unit, configured to transparently transmit the Activate PDP Context Request message to a network device of the core network when the APN recognized by the first recognition unit identifies the core network.

12. The access network device according to claim 10, wherein the access network device is one of the group consisting of: (a) an enhanced NodeB (eNB) in High Speed Packet Access (HSPA) flat architecture, (b) an eNB in a Long Term Evolution (LTE) system, (c) a base station in a Code Division Multiple Access 2000 (CDMA2000) system, and (d) a NodeB in a Time Division-Synchronous Code Division Multiple Access (TD-SCDMA) system.

13. The access network device according to claim 11, wherein the access network device is one of the group consisting of: (a) an enhanced NodeB (eNB) in High Speed Packet Access (HSPA) flat architecture, (b) an eNB in a Long Term Evolution (LTE) system, (c) a base station in a Code Division Multiple Access 2000 (CDMA2000) system, and (d) a NodeB in a Time Division-Synchronous Code Division Multiple Access (TD-SCDMA) system.

14. A system for transmitting packet switched (PS) services, comprising:
   a recognition unit, configured to receive an Activate Packet Data Protocol (PDP) Context Request message of a PS service sent from a User Equipment (UE), and recognize an Access Point Name (APN) for identifying a core network or an APN identifying an external network carried in the Activate PDP Context Request message;
   a channel unit in an access network, configured to establish a corresponding transmission channel according to an APN, wherein if the APN identifies the external network, a transmission channel directly connected to the external network is established via a gateway General Packet Radio Service (GPRS) support node (GGSN)-like function, which is configured in the access network; and
   a transmission unit, configured to transmit the PS service through the transmission channel established by the channel unit;
   wherein the GGSN-like function routes user data and allocates Internet Protocol (IP) addresses to the UE, and allows direct connection to the external network via a Gi interface,
   wherein a logical interface which is configured in the access network connects the GGSN-like function to the external network.

15. The system according to claim 14, wherein the recognition unit is located in the access network.

16. The system according to claim 14, wherein the recognition unit is located in the core network.

17. The system according to claim 15, wherein the channel unit comprises a first channel sub-unit and/or a second channel sub-unit,
   the first channel sub-unit is located in the core network, and is configured to establish a first transmission channel between the UE and the core network when a recognition result of the recognition unit indicates that the APN identifies the core network; and
   the second channel sub-unit is located in the access network, and is configured to establish a second transmission channel between the UE and the access network when the recognition result of the recognition unit indicates that the APN identifies the external network, wherein the second transmission channel is directly connected to the external network.

18. The system according to claim 16, wherein the channel unit comprises a first channel sub-unit and/or a second channel sub-unit,
   the first channel sub-unit is located in the core network, and is configured to establish a first transmission channel between the UE and the core network when a recognition result of the recognition unit indicates that the APN identifies the core network; and
   the second channel sub-unit is located in the access network, and is configured to establish a second transmission channel between the UE and the access network when the recognition result of the recognition unit indicates that the APN identifies the external network, wherein the second transmission channel is directly connected to the external network.

19. The system according to claim 14, wherein the system is one of the group consisting of (a) a High Speed Packet Access (HSPA) flat architecture system, (b) a Long Term Evolution (LTE) system, (c) a Code Division Multiple Access 2000 (CDMA2000) system, and (d) a Time Division-Synchronous Code Division Multiple Access (TD-SCDMA) system.

20. The system according to claim 15, wherein the system is one of the group consisting of (a) a High Speed Packet Access (HSPA) flat architecture system, (b) a Long Term Evolution (LTE) system, (c) a Code Division Multiple Access 2000 (CDMA2000) system, and (d) a Time Division-Synchronous Code Division Multiple Access (TD-SCDMA) system.

* * * * *

UNITED STATES PATENT AND TRADEMARK OFFICE
CERTIFICATE OF CORRECTION

| | | |
|---|---|---|
| PATENT NO. | : 9,066,281 B2 | Page 1 of 1 |
| APPLICATION NO. | : 13/091555 | |
| DATED | : June 23, 2015 | |
| INVENTOR(S) | : Qin et al. | |

It is certified that error appears in the above-identified patent and that said Letters Patent is hereby corrected as shown below:

In the claims
Column 13, line 32-33, "routes user data and allocates" should read -- route user data and allocate --.

Signed and Sealed this
Eighth Day of December, 2015

Michelle K. Lee
*Director of the United States Patent and Trademark Office*